US009901875B2

(12) United States Patent
Tanaka et al.

(10) Patent No.: US 9,901,875 B2
(45) Date of Patent: Feb. 27, 2018

(54) RECLAIMING DEVICE, METHOD, AND RECOVERY UNIT OF $CO_2$, $H_2S$, OR BOTH OF $CO_2$ AND $H_2S$

(71) Applicant: MITSUBISHI HEAVY INDUSTRIES, LTD., Tokyo (JP)

(72) Inventors: Hiroshi Tanaka, Tokyo (JP); Hiromitsu Nagayasu, Tokyo (JP); Takuya Hirata, Tokyo (JP); Atsuhiro Yukumoto, Tokyo (JP); Tsuyoshi Oishi, Tokyo (JP); Shinsuke Nakatani, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/027,818

(22) PCT Filed: Oct. 14, 2014

(86) PCT No.: PCT/JP2014/077354
§ 371 (c)(1),
(2) Date: Apr. 7, 2016

(87) PCT Pub. No.: WO2015/056677
PCT Pub. Date: Apr. 23, 2015

(65) Prior Publication Data
US 2016/0288049 A1 Oct. 6, 2016

(30) Foreign Application Priority Data
Oct. 18, 2013 (JP) .................. 2013-217749

(51) Int. Cl.
*B01D 53/14* (2006.01)
*B01D 53/18* (2006.01)
(Continued)

(52) U.S. Cl.
CPC ......... *B01D 53/78* (2013.01); *B01D 53/1425* (2013.01); *B01D 53/1468* (2013.01);
(Continued)

(58) Field of Classification Search
CPC ........ B01D 2251/304; B01D 2251/604; B01D 2252/204; B01D 2252/20478;
(Continued)

(56) References Cited

U.S. PATENT DOCUMENTS

| 2012/0125196 A1 | 5/2012 | Woodhouse et al. |
| 2013/0315809 A1 | 11/2013 | Shimamura |
| 2014/0248206 A1* | 9/2014 | Tsujiuchi ........... B01D 53/1475 423/437.1 |

FOREIGN PATENT DOCUMENTS

| CA | 2826750 A1 | 8/2012 |
| JP | 63-40902 | 2/1988 |

(Continued)

OTHER PUBLICATIONS

English translation of JP 2013208531 accessed Mar. 3, 2017.*
(Continued)

*Primary Examiner* — Cabrena Holecek
(74) *Attorney, Agent, or Firm* — Westerman, Hattori, Daniels & Adrian

(57) ABSTRACT

Provided are a reclaimer that introduces a part of an absorbent that has absorbed $CO_2$ or $H_2S$ in a flue gas through an introduction line and stores the absorbent, a heating section that heats the absorbent stored in the reclaimer to obtain recovered vapor, and a mixing tank disposed on the introduction line through which the absorbent is introduced into the reclaimer, and which introduces an absorbent (lean solution) and an alkaline agent for mixing thereof.

9 Claims, 4 Drawing Sheets

(51) Int. Cl.
- *B01D 53/52* (2006.01)
- *B01D 53/62* (2006.01)
- *B01D 53/78* (2006.01)
- *C01B 3/52* (2006.01)
- *C10L 3/10* (2006.01)
- *C01B 31/20* (2006.01)
- *C01B 17/16* (2006.01)

(52) U.S. Cl.
CPC ..... *B01D 53/1475* (2013.01); *B01D 53/1493* (2013.01); *B01D 53/18* (2013.01); *B01D 53/52* (2013.01); *B01D 53/526* (2013.01); *B01D 53/62* (2013.01); *C01B 3/52* (2013.01); *C01B 17/167* (2013.01); *C01B 31/20* (2013.01); *C10L 3/103* (2013.01); *C10L 3/104* (2013.01); *B01D 2251/304* (2013.01); *B01D 2251/604* (2013.01); *B01D 2252/204* (2013.01); *B01D 2252/20478* (2013.01); *B01D 2257/304* (2013.01); *B01D 2257/504* (2013.01); *B01D 2258/0283* (2013.01); *C01B 2203/0475* (2013.01); *C01B 2203/0485* (2013.01); *C10L 2290/06* (2013.01); *C10L 2290/12* (2013.01); *C10L 2290/24* (2013.01); *C10L 2290/541* (2013.01); *C10L 2290/60* (2013.01); *Y02C 10/04* (2013.01); *Y02C 10/06* (2013.01); *Y02P 20/152* (2015.11); *Y02P 30/30* (2015.11)

(58) Field of Classification Search
CPC ........ B01D 2257/304; B01D 2257/504; B01D 53/1425; B01D 53/1468; B01D 53/1475; B01D 53/1493; B01D 53/18; B01D 53/52; B01D 53/526; B01D 53/62; B01D 53/78; C01B 17/167; C01B 2203/0475; C01B 2203/0485; C01B 31/20; C01B 3/52; C10L 2290/06; C10L 2290/12; C10L 2290/24; C10L 2290/541; C10L 2290/60; C10L 3/103; C10L 3/104; Y02C 10/04; Y02C 10/06; Y02P 20/152; Y02P 30/30

See application file for complete search history.

(56) References Cited

FOREIGN PATENT DOCUMENTS

| JP | 5-245339 A | 9/1993 |
| JP | 2012-166139 A | 9/2012 |
| JP | 2012-529364 A | 11/2012 |
| JP | 2013-208531 A | 10/2013 |
| JP | 2013208531 A * | 10/2013 |
| WO | 2013/088731 A1 | 6/2013 |

OTHER PUBLICATIONS

Translation of Written Opinion dated Jan. 20, 2015, issued in counterpart International Patent Application No. PCT/JP2014/077354. (9 pages).

Decision of a Patent Grant dated Dec. 6, 2016, issued in Japanese counterpart application No. 2013-217749, with English Translation. (5 pages).

Office Action dated Jun. 28, 2016, issued in counterpart Japanese Patent Application No. 2013-217749, with English translation. (8 pages).

International Search Report, w/English translation and Written Opinion in Japanese dated Jan. 20, 2015, issued in counterpart International Application No. PCT/JP2014/077354 (10 pages).

Extended (Supplementary) European Search Report (EESR) dated Sep. 22, 2016, issued in counterpart European Patent Application No. 14 853 335.9. (7 pages).

* cited by examiner

RECLAIMING DEVICE, METHOD, AND RECOVERY UNIT OF $CO_2$, $H_2S$, OR BOTH OF $CO_2$ AND $H_2S$

FIELD

The present invention relates to a reclaiming device, a method, and a recovery unit of $CO_2$, $H_2S$, or both of $CO_2$ and $H_2S$.

BACKGROUND

In recent years, as a cause of global warming of the earth, the greenhouse effect due to $CO_2$ has been pointed out, and measures against the greenhouse effect is internationally imperative in terms of protection of the earth environment. Generation sources of $CO_2$ extend over every field of human activities that burn fossil fuels, and demands for suppression of emission of $CO_2$ tends to increase. In response to the demands, a method of bringing a flue gas in a boiler in contact with an amine-based $CO_2$ absorbent such as an alkanolamine aqueous solution to remove and recover $CO_2$ in the flue gas, and a method of storing the recovered $CO_2$ without emitting $CO_2$ to the air have been vigorously studied for power generation facilities such as thermal power stations that use a large amount of fossil fuels.

Conventionally, Patent Literature 1 discloses a method of removing $CO_2$ (carbon dioxide) and SOx (sulfur oxide) in a flue gas. This method includes a denitrification process of reducing NOx (nitrogen oxide) contained in a flue gas to perform denitrification treatment, a desulfurization process of bringing SOx contained in the flue gas in contact with calcium carbonate in slurry to perform desulfurization treatment, a $CO_2$ desorption process of bringing the flue gas subjected to the denitrification treatment and the desulfurization treatment in countercurrent contact with an amine-based absorbent (alkanolamine aqueous solution) in an absorber to cause the absorbent to absorb $CO_2$ in the flue gas, and an absorbent regenerating process of obtaining a lean solution by removing $CO_2$ from a rich solution that has absorbed $CO_2$ in a regenerator to put the lean solution back to the absorber again. Then, in this method, to prevent a situation where a deteriorated substance containing a thermally stable salt caused by oxidative degradation of alkanolamine in oxygen in the flue gas and by a reaction of alkanolamine with residual NOx or residual SOx, as well as a solid such as dust contained in the flue gas is accumulated in a system that the absorbent passes through, reclaiming is performed, which includes heating the absorbent in a reclaimer, concentrating a coexisting substance as sludge, and removing the deteriorated substance from the absorbent.

CITATION LIST

Patent Literature

Patent Literature 1: Japanese Patent Application Laid-open No. 5-245339

SUMMARY

Technical Problem

However, in a conventional reclaiming operation, a whole amount of highly-concentrated alkaline agent (NaOH) for neutralization is directly fed into the reclaimer, and a part of the lean solution as the absorbent regenerated in the regenerator is then introduced into the reclaimer. Therefore, there are problems as follows:

1) the highly-concentrated alkaline agent and the absorbent fed into the reclaimer are locally in contact and a solid is deposited in a supply unit of the absorbent, and thereby an operation for reclaiming fluctuates, and 2) as a result, a variance of the concentration of an in-reclaimer fluid is caused, and when steam is supplied to a place where the variance of the concentration is caused, intensive vaporization is partially caused. Therefore, the in-reclaimer fluid is entrained in recovered vapor recovered from the reclaimer, and an absorbent coexisting component is entrained in the regenerator. Therefore, separation and removal of the absorbent coexisting component is insufficient.

Therefore, emergence of a reclaiming device that, prevents entrainment of an in-reclaimer fluid in recovered vapor recovered from a reclaimer, and entrainment of an absorbent coexisting component in a regenerator, in regenerating the absorbent in the reclaimer, has been desired.

In view of the foregoing, an objective of the present invention is to provide a reclaiming device, a method, and a recovery unit of $CO_2$, $H_2S$, or both of them, which can prevent entrainment of an in-reclaimer fluid in recovered vapor recovered from a reclaimer, and entrainment of an absorbent coexisting component in a regenerator.

Solution to Problem

According to a first embodiment in order to solve the above mentioned problem, there is provided a reclaiming device comprising: a reclaimer configured to introduce and store a part of an absorbent that recovers $CO_2$ or $H_2S$ in a gas in a recovery unit; a heating section configured to heat the absorbent stored in the reclaimer to obtain recovered vapor; and a mixing tank disposed on an introduction line through which the absorbent is introduced into the reclaimer, and configured to introduce the absorbent and an alkaline agent for mixing thereof.

According to a second embodiment, in the first embodiment, there is provided the reclaiming device comprising: a gas-liquid separator provided in a discharge line through which the recovered vapor from the reclaimer is discharged, and configured to separate a coexisting substance entrained in the recovered vapor; and a cooler provided in the discharge line, and configured to cool the recovered vapor introduced into the gas-liquid separator.

According to a third embodiment, in the first and second embodiments, there is provided the reclaiming device wherein reflux water from a $CO_2$ recovery unit is introduced into the mixing tank to dilute and mix the absorbent and the alkaline agent.

According to a fourth embodiment, in the second embodiment, there is provided the reclaiming device wherein cooling water of the cooler is reflux water.

According to a fifth embodiment, there is provided a reclaiming method comprising: in recovering a part of an absorbent that recovers $CO_2$ or $H_2S$ in a flue gas in a recovery unit, mixing the absorbent and an alkaline agent in advance, then introducing a solution mixture thereof into a reclaimer to obtain recovered vapor.

According to a sixth embodiment, in the fifth embodiment, there is provided the reclaiming method comprising: cooling the recovered vapor from the reclaimer, then separating an entrained coexisting substance by gas-liquid separation, and removing the liquid coexisting substance.

According to a seventh embodiment, in the fifth and sixth embodiments, there is provided the reclaiming method comprising: introducing reflux water from a $CO_2$ recovery unit to dilute and mix the absorbent and the alkaline agent.

According to a eighth embodiment, in the sixth embodiment, there is provided the reclaiming method wherein cooling water that cools the recovered vapor is reflux water.

According to a ninth embodiment, there is provided a recovery unit of $CO_2$, $H_2S$, or both of $CO_2$ and $H_2S$, the recovery unit comprising: an absorber configured to bring a gas containing $CO_2$, $H_2S$, or both of $CO_2$ and $H_2S$, and an absorbent in contact to remove $CO_2$, $H_2S$, or both of $CO_2$ and $H_2S$; an absorbent regenerator configured to regenerate a solution that has absorbed $CO_2$, $H_2S$, or both of $CO_2$ and $H_2S$ to obtain the absorbent; and the reclaiming device according to any one of claims 1 to 4, configured to extract a part, of the absorbent regenerated in the absorbent regenerator, and to remove a coexisting substance in the absorbent, wherein the absorbent regenerated in the absorbent regenerator is circulated and reused in the absorber, and the recovered vapor recovered from the reclaiming device is introduced into the absorbent regenerator.

Advantageous Effects of Invention

According to the present, invention, an absorbent, and an alkaline agent are mixed in a mixing tank in advance before being introduced into a reclaimer, so that a reclaiming operation can be performed in a uniform state. Therefore, entrainment of an in-reclaimer fluid in recovered vapor recovered from a reclaimer, and entrainment of an absorbent coexisting component in an absorbent, regenerator are prevented.

DESCRIPTION OF EMBODIMENTS

Hereinafter, favorable embodiments of the present invention will be described in detail with reference to the appended drawings. Note that the present invention is not limited by the embodiments, and when there is a plurality of embodiments, the present invention includes those obtained by combining the embodiments.

First Embodiment

While an employable process to remove $CO_2$, $H_2S$, or both of them in a gas of the present invention is not especially limited, an example of a removing device that removes $CO_2$ will be described with reference to FIG. 1.

Examples of gases to be treated by the present invention include a coal gasifier gas, a synthesis gas, a coke oven gas, a petroleum gas, a natural gas, and a flue gas. However, the gas is not limited to these examples, and any gas can be employed as long as the gas contains an acid gas such as $CO_2$ or $H_2S$.

In the following embodiment, a flue gas containing $CO_2$ as the acid gas will be described.

Figure 1:
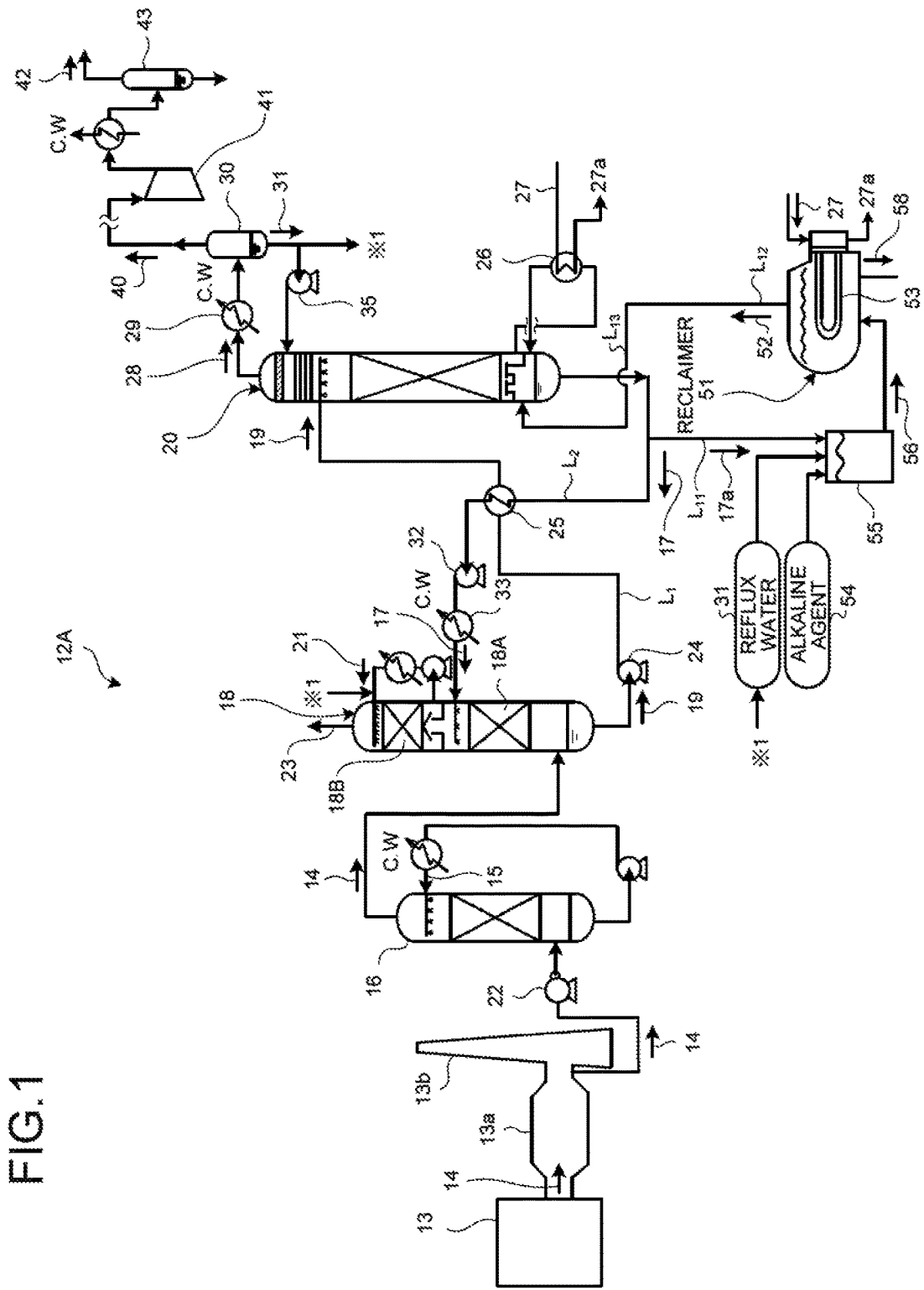
FIG. 1 is a schematic diagram of a recovery unit of $CO_2$, $H_2S$, or both of them according to a first embodiment.

FIG. 1 is a schematic diagram illustrating a configuration of a $CO_2$ recovery unit according to the first embodiment. As illustrated in FIG. 1, a $CO_2$ recovery unit 12A according to the first embodiment includes a flue gas cooling device 16 that cools a flue gas 14 containing $CO_2$ and $O_2$ discharged from an industrial combustion facility 13 such as a boiler or a gas turbine with cooling water 15, a $CO_2$ absorber 18 including a $CO_2$ recovery section 18A that brings the cooled flue gas 14 containing $CO_2$ and a $CO_2$ absorbent (hereinafter, referred to as "absorbent") 17 that absorbs $CO_2$ in contact to remove $CO_2$ from the flue gas 14, and an absorbent regenerator 20 that causes a $CO_2$ absorbent (hereinafter, also referred to as "rich solution") 19 that has absorbed $CO_2$ to emit $CO_2$ to regenerate a $CO_2$ absorbent. Then, in a $CO_2$ recovery unit 12, the regenerated $CO_2$ absorbent (hereinafter, referred to as "lean solution") 17 from which $CO_2$ has been removed in the absorbent regenerator 20 is reused in the $CO_2$ absorber 18 as the $CO_2$ absorbent.

Note that, in FIG. 1, the reference sign 13a is a flue gas duct, 13b is a stack, 27a is steam condensate. There are two cases for the $CO_2$ recovery unit, which includes a case of providing the $CO_2$ recovery unit later to recover $CO_2$ from an already provided flue gas source, and a case of placing the $CO_2$ recovery unit along with a newly provided flue gas source at the same time. A damper is installed to the stack 13b, and is closed at the time of an operation of the $CO_2$ recovery unit 12A. Further, the damper is set to open when the operation of the $CO_2$ recovery unit 12A is stopped although the flue gas source is operated.

In a method of recovering $CO_2$ using the $CO_2$ recovery unit 12A, first, a pressure of the flue gas 14 containing $CO_2$ from the industrial combustion facility 13 such as a boiler or a gas turbine is increased by a flue gas blower 22, and the flue gas 14 is then sent to the flue gas cooling device 16 to be cooled with the cooling water 15, and then sent to the $CO_2$ absorber 18.

In the $CO_2$ absorber 18, the floe gas 14 is brought in counter-current contact with the $CO_2$ absorbent 17 that is an amine absorbent according to the present embodiment, and $CO_2$ in the flue gas 14 is absorbed in the $CO_2$ absorbent 17 by a chemical reaction.

The $CO_2$-removed flue gas from which $CO_2$ has been removed in the $CO_2$ recovery section ISA is brought in gas-liquid contact with circulating rinse water 21 containing the $CO_2$ absorbent supplied through a nozzle in a water cleaning section 18B in the $CO_2$ absorber 18, the $CO_2$ absorbent 17 entrained in the $CO_2$-removed flue gas is recovered, and then a flue gas 23 from which $CO_2$ has been removed is discharged outside the system.

Further, a pressure of the rich solution that is the $CO_2$-absorbed $CO_2$ absorbent 19 is increased by a rich solution pump 24, and then heated with the lean solution that is the $CO_2$ absorbent 17 regenerated in the absorbent regenerator 20, in a rich/lean solution heat exchanger 25 disposed on a rich solution supply line $L_1$ to be supplied to the absorbent regenerator 20.

The rich solution 19 discharged from an upper portion to an inside of the absorbent regenerator 20 causes an endothermic reaction by water vapor supplied from a bottom portion to emit most of $CO_2$. The $CO_2$ absorbent that has emitted a part or most of $CO_2$ in the absorbent regenerator 20 is called semi-lean solution. This semi-lean solution becomes the $CO_2$ absorbent (lean solution) 17 from which nearly all of $CO_2$ has been removed, when the semi-lean solution is about to reach the bottom portion of the absorbent regenerator 20. A part of the lean solution 17 is heated with heated water vapor 27 in a regenerating heater 26 to supply water vapor to the inside of the absorbent regenerator 20.

Meanwhile, a $CO_2$-entrained gas 28 accompanied by the water vapor discharged from the rich solution 19 and the semi-lean solution in the regenerator is led from a top of the absorbent regenerator 20, and then the water vapor is condensed by a condenser 29, and then water is separated in a separation drum 30, and then a $CO_2$ gas 40 is discharged outside the system to be separately compressed by a compressor 41 and recovered. This compressed/recovered $CO_2$ gas 42 is injected into an oil field using an enhanced oil recovery method (EOR) or stored in an aquifer after through a separation drum 43 to achieve measurements against the global warming.

Reflux water 31 separated/refluxed from the $CO_2$-entrained gas 28 accompanied by the water vapor in the separation drum 30 is supplied to the upper portion of the absorbent regenerator 20 and to the circulating rinse water 21 with a reflux water circulation pump 35.

The regenerated $CO_2$ absorbent (lean solution) 17 is cooled with the rich solution 19 in the rich/lean solution heat exchanger 25 disposed on an intersection of the rich solution supply line $L_1$ and a lean solution supply line $L_2$, then a pressure is increased by a lean solution pump 32, and then the $CO_2$ absorbent (lean solution) 17 is cooled in a lean solution cooler 33 to be supplied to the $CO_2$ absorber 18. Note that, in this embodiment, an outline has been merely described. Description is given omitting a part of devices that come with the $CO_2$ recovery unit.

A part of the absorbent 17 regenerated in the absorbent regenerator 20 is branched into an introduction line $L_{11}$ from the lean solution supply line $L_2$ and is introduced into a reclaimer 51, and then the heated water vapor 27 is supplied into a reclaimer to heat the absorbent indirectly for separating a coexisting substance.

Figure 2:
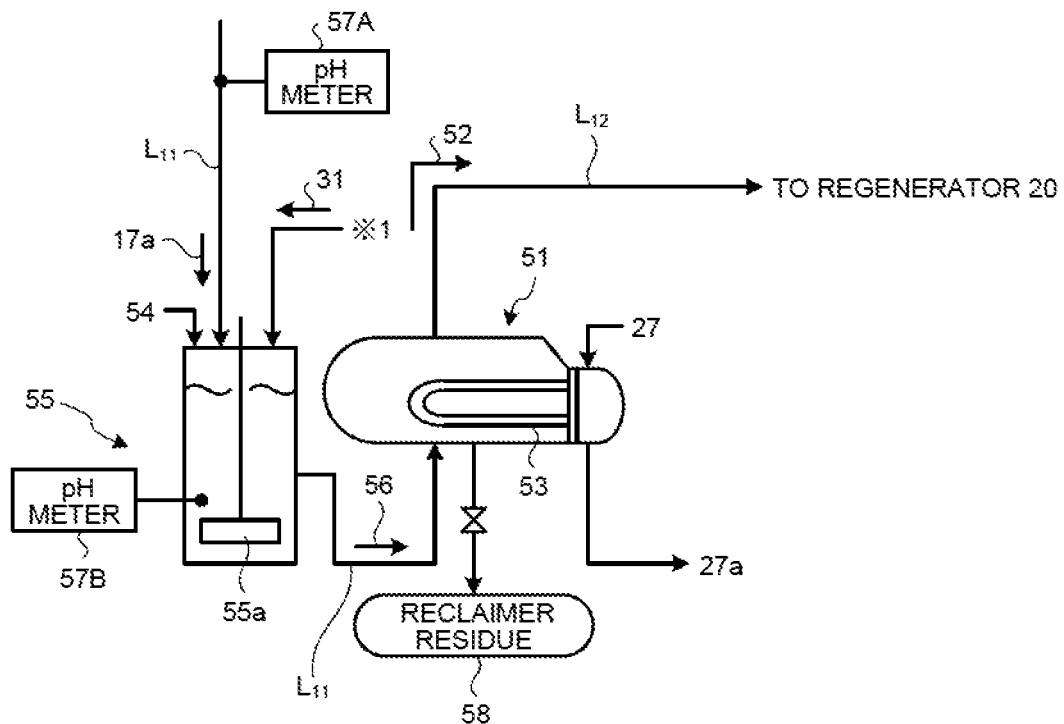
FIG. 2 is a schematic diagram of a reclaiming device according to the first embodiment.

FIG. 2 is a schematic diagram of a reclaiming device according to the first embodiment.

As illustrated in FIG. 2, the reclaiming device according to the present embodiment includes the reclaimer 51 that introduces a part of the absorbent 17 that has absorbed $CO_2$ or $H_2S$ in the flue gas 14 through the introduction line $L_{11}$ to store the absorbent 17, a heating section 53 that heats the absorbent 17 stored in the reclaimer 51 to obtain recovered vapor 52, and a mixing tank 55 which is disposed on the introduction line $L_{11}$ through which the absorbent 17 is introduced into the reclaimer 51, and which introduces a absorbent (lean solution 17a) and an alkaline agent 54 for mixing thereof to obtain a solution mixture 56. Note that the heated water vapor 27 is introduced into the heating section 53 to be indirectly heated for obtaining vapor condensed water 27a.

In the present embodiment, the reflux water 31 from the $CO_2$ recovery unit 12 is introduced into the mixing tank 55, and the absorbent (lean solution) 17a and the alkaline agent 54 are diluted and mixed with a mixing impeller 55a. This is because the $CO_2$ recovery unit 12A is a closed system, and thus water balance becomes worse when dilution water is introduced from an outside for dilution.

In the mixing tank 55, the absorbent 17, the alkaline agent 54, and the reflux water 31 are introduced and mixed for a preliminary mixture of the alkaline agent 54. By performing this preliminary mixture, the concentration becomes uniform. Then, the solution mixture 56 is supplied to the reclaimer 51 through the introduction line $L_{11}$.

As a result, by mixing the absorbent 17, the alkaline agent 54, and the reflux water 31 in the mixing tank 55 in advance, operation fluctuation of the reclaimer is prevented due to uniformity of the concentration, and entrainment of an in-reclaimer fluid in recovered vapor due to the operation fluctuation is prevented.

In mixing the absorbent 17, the alkaline agent 54, and the reflux water 31, the alkaline agent 54 is not fed into the mixing tank 55 first, and is favorably gradually added together with introduction of the absorbent 17.

At that time, a first pH meter 57A is installed on the introduction line $L_{11}$, and the alkaline agent 54 is supplied while pH is controlled.

Then, the absorbent 17 of at the time of introduction is measured with the first pH meter 57A, The alkaline agent 54 is added such that a difference "Y−X" becomes "1" or more in an alkaline side, where a pH value of the absorbent 17 is "X" and a pH value of the solution mixture 56 in the mixing tank 55 measured with a second pH meter 57B is "Y".

Accordingly, a necessary amount of the alkaline agent is added, and excessive addition of the alkaline agent is prevented.

As described above, by adding the alkaline agent (NaOH) to the absorbent (including amine nitrate or amine sulfate) while adjusting the alkaline agent to obtain sodium sulfate or sodium nitrate, amines in an ion state are made to amines in a free state, and a solution mixture containing the free amines is introduced into the reclaimer.

By making the solution mixture 56 in advance and adjusting alkaline, the free amines become to have a vapor pressure. Therefore, the free amines are recovered in recovered vapor as a vaporized body. The amines in the ion state do not have the vapor pressure, and thus are not entrained in the recovered vapor.

The coexisting substance fixed by the added alkaline agent and not having the vapor pressure is extracted from a bottom portion of the reclaimer 51 as a reclaimer residue 58 to be separately treated.

As described above, the absorbent 17, the alkaline agent 54, and the reflux water 31 are made into the solution mixture 56 in the mixing tank 55 in advance, and the solution mixture 56 is then introduced into the reclaimer 51. Therefore, nonuniformity of the concentration in the reclaimer 51 is prevented, unlike a conventional case of directly introducing the absorbent 17, the alkaline agent 54, and the reflux water 31.

As a result, the operation fluctuation associated with partially intensive vaporization due to the nonuniformity of the concentration like a conventional case is prevented, and scattering of the in-reclaimer fluid entrained in the recovered vapor 52 is prevented. Accordingly, selective separation and removal of the absorbent coexisting substance are improved, and operation reliability including reduction of absorbent corrosiveness can be improved.

An effect of the present embodiment will be described with reference to FIG. 3.

Figure 3:
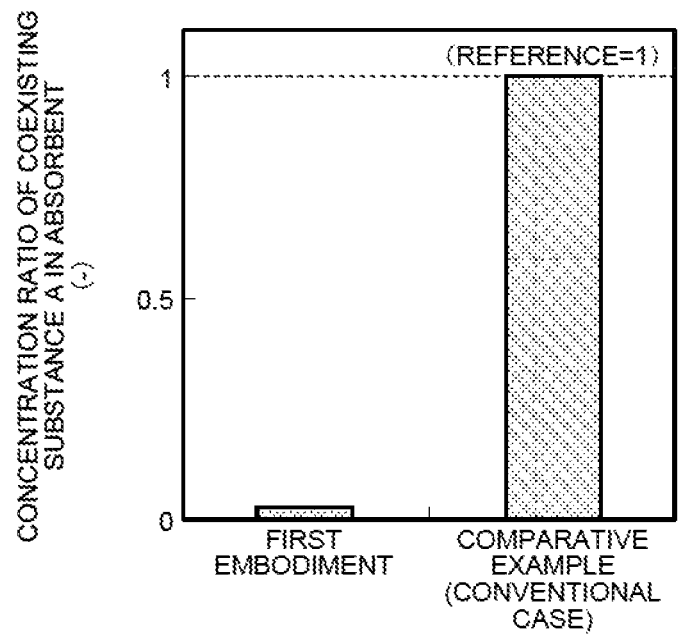
FIG. 3 is a diagram illustrating concentration ratios of a coexisting substance in recovered vapor in a conventional example and the first embodiment.

FIG. 3 is a diagram illustrating concentration ratios of a coexisting substance in recovered vapor in a conventional example and the first embodiment (the conventional example is reference (1)). The conventional technology is a case of performing mixture of an absorbent and an alkaline agent in a reclaimer without providing a mixing tank like the present embodiment.

When the concentration ratio of the conventional example is the reference (1), the concentration ratio of the coexisting substance in recovered vapor 52 of the present embodiment is substantially decreased to 10% or less.

Second Embodiment

Figure 4:
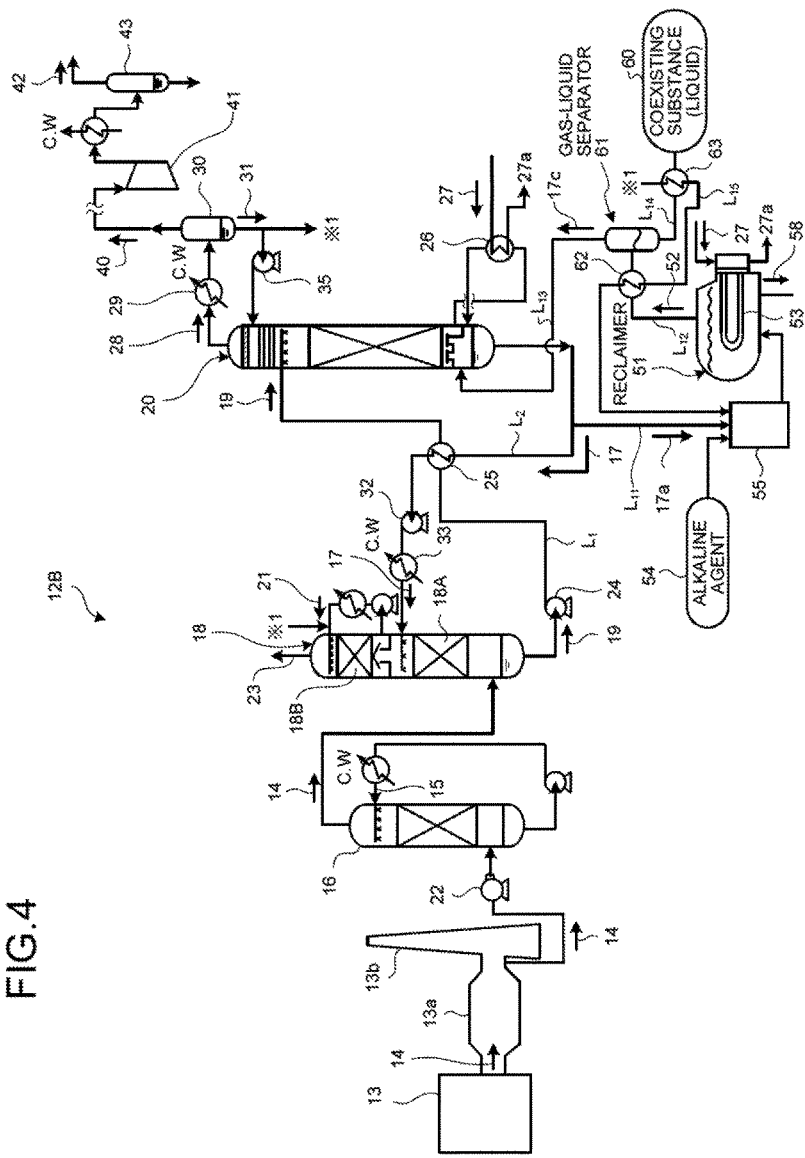
FIG. 4 is a schematic diagram of a recovery unit of $CO_2$, $H_2S$, or both of them according to a second embodiment.

A reclaiming device according to an embodiment of the present invention will be described with reference to the drawings. FIG. 4 is a schematic diagram of a recovery unit of $CO_2$, $H_2S$, or both of them according to a second embodiment. Mote that the same member as the first embodiment is denoted with the same reference sign, and description thereof is omitted.

As illustrated in FIG. 4, a $CO_2$ recovery unit 12B according to the present embodiment further includes a gas-liquid separator 61 and a first cooler 62, in the reclaiming device of the first embodiment, the gas-liquid separator 61 being provided in a discharge line $L_{12}$ through which recovered vapor 52 from a reclaimer 51 is discharged, and separating a coexisting substance 60 entrained in the recovered vapor 52, and the first cooler 62 being provided in the discharge line $L_{12}$ to cool the recovered vapor 52 to be introduced into the gas-liquid separator 61.

Further, in the present embodiment, reflux water 31 of the $CO_2$ recovery unit 12 is introduced into the first cooler 62. Note that the reflux water 31 is introduced into the first cooler 62 through a cooling water line $L_{15}$ after passing through a second cooler 63 for cooling a coexisting substance (liquid) separated in the gas-liquid separator 61.

In the reclaimer 51, the coexisting substance 60 having a vapor pressure is entrained in the recovered vapor 52. Therefore, the entrained coexisting substance 60 can be separated and removed by the gas-liquid separator 61 of the second embodiment. Note that a separated absorbent vapor 17c is supplied from an upper portion of the gas-liquid liquid separate 61 to a lower portion of an absorbent regenerator 20 through an introduction line $L_{13}$. Further, the coexisting substance (liquid) 60 is discharged from a lower portion of the gas-liquid separate 61 through a discharge line $L_{14}$.

That is, the coexisting substance 60 with a higher boiling point than amines in a free state of the absorbent is cooled in the first cooler 62 according to the boiling point. In the present embodiment, the temperature is decreased by about 6 to 7° C. Thereby the coexisting substance 60 is liquefied and separated in the gas-liquid separator 61.

An effect of the present embodiment will be described with reference to FIG. 5.

Figure 5:
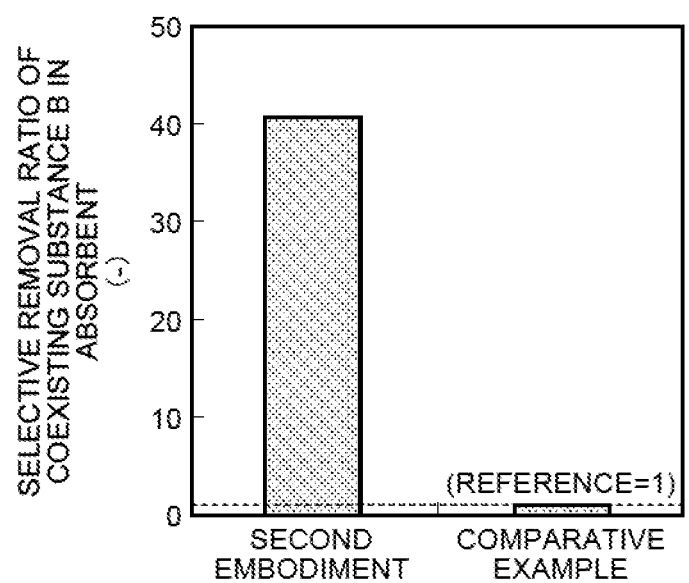
FIG. 5 is a diagram illustrating selective removable ratios in recovered vapor in a conventional example and the second embodiment.

FIG. 5 is a diagram illustrating selective removal ratios in recovered vapor in a conventional example and the second embodiment (the conventional example is a reference (1)). The conventional technology is a case of performing mixture of an absorbent and an alkaline agent in a reclaimer without providing a gas-liquid separator like the present embodiment.

When the selection removal ratio of the conventional example is the reference (1), the selection removal ratio of the coexisting substance in the recovered vapor 52 in the present embodiment is 40, and the coexisting material can be substantially removed.

REFERENCE SIGNS LIST

12 $CO_2$ recovery unit
13 Industrial combustion facility
14 Flue gas
16 Flue gas cooling device
17 $CO_2$ absorbent (lean solution)
18 $CO_2$ absorber
19 $CO_2$-absorbed $CO_2$ absorbent (rich solution)
20 Absorbent regenerator
21 Rinse water
51 Reclaimer
52 Recovery vapor
54 Alkaline agent
55 Mixing tank
56 Solution mixture

The invention claimed is:

1. A recovery unit of $CO_2$, $H_2S$, or both of $CO_2$ and $H_2S$, the recovery unit comprising:
   an absorber configured to bring a gas containing $CO_2$, $H_2S$, or both of $CO_2$ and $H_2S$, and an absorbent in contact to remove $CO_2$, $H_2S$, or both of $CO_2$ and $H_2S$;
   an absorbent regenerator configured to regenerate a rich solution that has absorbed $CO_2$, $H_2S$, or both of $CO_2$ and $H_2S$ to obtain a lean solution which is to be circulated and reused in the absorber;
   a reclaimer configured to extract a part of the lean solution regenerated in the absorbent regenerator through an introduction line to remove a coexisting substance in the lean solution;
   a heating section configured to heat the lean solution stored in the reclaimer to obtain recovered vapor;
   a mixing tank interposed on the introduction line and configured to dilute and mix the lean solution and an alkaline agent with reflux water separated from a gas entraining $CO_2$, $H_2S$, or both of $CO_2$ and $H_2S$ in a top of the absorbent regenerator, to keep the uniform concentration distribution of each component and avoid solid deposition containing heat stable salts; and
   a discharge line through which the recovered vapor discharged from the reclaimer is introduced into the absorbent regenerator.

2. The recovery unit of $CO_2$, $H_2S$, or both of $CO_2$ and $H_2S$ according to claim 1, comprising;
   a first pH meter configured to measure a pH value of the lean solution in the introduction line;
   a second pH meter configured to measure a pH value of a solution mixture in the mixing tank;
   wherein the alkaline agent is added depending on a difference (Y–X) between (Y) which is the pH value of the second pH meter and (X) which is the pH value of the first pH meter.

3. The recovery unit of $CO_2$, $H_2S$, or both of $CO_2$ and $H_2S$ according to claim 2, wherein
   the alkaline agent is added so that the difference (Y–X) between (Y) which is the pH value of the second pH meter and (X) which is the pH value of the first pH meter becomes "1" or more in an alkaline side.

4. The recovery unit of $CO_2$, $H_2S$, or both of $CO_2$ and $H_2S$ according to claim 1, comprising;
   a gas-liquid separator provided in the discharge line and configured to separate a coexisting substance entrained in the recovered vapor; and
   a cooler provided in the discharge line, and configured to cool the recovered vapor introduced into the gas-liquid separator.

5. The recovery unit of $CO_2$, $H_2S$, or both of $CO_2$ and $H_2S$ according to claim 2, comprising;
   a gas-liquid separator provided in the discharge line and configured to separate a coexisting substance entrained in the recovered vapor; and
   a cooler provided in the discharge line, and configured to cool the recovered vapor introduced into the gas-liquid separator.

6. The recovery unit of $CO_2$, $H_2S$, or both of $CO_2$ and $H_2S$ according to claim 3, comprising;
   a gas-liquid separator provided in the discharge line and configured to separate a coexisting substance entrained in the recovered vapor; and
   a cooler provided in the discharge line, and configured to cool the recovered vapor introduced into the gas-liquid separator.

7. The recovery unit of $CO_2$, $H_2S$, or both of $CO_2$ and $H_2S$ according to claim 4, wherein cooling water of the cooler is reflux water.

8. The recovery unit of $CO_2$, $H_2S$, or both of $CO_2$ and $H_2S$ according to claim 5, wherein cooling water of the cooler is reflux water.

9. The recovery unit of $CO_2$, $H_2S$, or both of $CO_2$ and $H_2S$ according to claim 6, wherein cooling water of the cooler is reflux water.

* * * * *